United States Patent [19]
Barrett

[11] Patent Number: 5,287,420
[45] Date of Patent: Feb. 15, 1994

[54] METHOD FOR IMAGE COMPRESSION ON A PERSONAL COMPUTER

[75] Inventor: Peter T. Barrett, Palo Alto, Calif.

[73] Assignee: SuperMac Technology, Sunnyvale, Calif.

[21] Appl. No.: 865,085

[22] Filed: Apr. 8, 1992

[51] Int. Cl.$^5$ ............................ G06K 9/36; H04N 7/12
[52] U.S. Cl. ................................. 382/56; 364/715.02; 348/384
[58] Field of Search ................... 382/49, 56; 358/134, 358/404, 444, 451, 426, 903; 364/715.02

[56] References Cited

U.S. PATENT DOCUMENTS

| | | | |
|---|---|---|---|
| 4,903,317 | 2/1990 | Nishihara et al. | 382/56 |
| 5,050,230 | 9/1991 | Jones et al. | 382/56 |
| 5,068,745 | 11/1991 | Shimura | 358/403 |
| 5,101,280 | 3/1992 | Moronaga et al. | 358/426 |
| 5,124,811 | 6/1992 | Ohsawa et al. | 358/426 |
| 5,138,459 | 8/1992 | Roberts et al. | 358/903 |

*Primary Examiner*—Leo H. Boudreau
*Assistant Examiner*—Christopher Kelley
*Attorney, Agent, or Firm*—Limbach & Limbach

[57] ABSTRACT

A method and apparatus for image compression suitable for personal computer applications, which compresses and stores data in two steps. An image is captured in real-time and compressed using an efficient method and stored to a hard-disk. At some later time, the data is further compressed in non-real-time using a computationally more intense algorithm that results in a higher compression ratio. The two-step approach allows the storage reduction benefits of a highly sophisticated compression algorithm to be achieved without requiring the computational resources to perform this algorithm in real-time. A compression algorithm suitable for performing the first compression step on a host processor in a personal computer is also described. The first compression step accepts 4:2:2 YCrCb data from the video digitizer. The two chrominance components are averaged and a pseudo-random number is added to all components. The resulting values are quantized and packed into a single 32-bit word representing a 2×2 array of pixels. The seed value for the pseudo-random number is remembered so that the pseudo-random noise can be removed before performing the second compression step.

9 Claims, 6 Drawing Sheets

METHOD FOR IMAGE COMPRESSION ON A PERSONAL COMPUTER

BACKGROUND OF THE INVENTION

Color images are generally represented in a computer environment with an independent color value for each pixel. Each color value must consist of three components in order to represent the full range of colors. Since the display monitors that are used with computers utilize RGB (red, green, and blue) as the three color components, computer images are generally represented using this color format.

Images stored in this format generally require a large data set, but also contain a lot of redundancy because of the high pixel-to-pixel correlation of typical images. If the images are part of a moving sequence of images, as in video, the storage requirements are multiplied by the number of frames. Further, the bandwidth requirements to display a video sequence are much higher than can typically be provided in a low cost computer system. It is often desirable to utilize data compression to reduce data storage and bandwidth requirements. Compression algorithms can take advantage of redundancy in the image and the peculiarities of the human vision system.

Several image compression algorithms have been developed which are reasonably effective at reducing the data storage and bandwidth requirements. The compression ratio that can be achieved is a function of the computational resources that can be applied. And since the utility of image compression is determined by the compression ratio that can be achieved, specialized VLSI compression processors are generally required to provide adequate computational resources to make image compression worthwhile. It is also necessary to provide adequate compression to reduce the bandwidth requirements of the video so that it can be stored on the available mass storage device.

The requirement for specialized VLSI has limited the market potential for digital video applications, since conventional PCs generally do not have these capabilities. To expand the market potential, a video compression method which can be implemented by conventional PCs is necessary.

Many of the applications which require video use short video clips—on the order of 10 to 15 seconds. Many personal computers will have adequate free disk space to store this much video, even with only limited compression. However, since multiple video clips are generally required for an application, a high degree of compression is ultimately required for the application to be cost effective.

Thus, an object of the invention is a method for image compression that can be executed on a conventional PC without specialized VLSI to support compression.

Another object of the invention is a compression method which will result in adequate compression to reduce the bandwidth requirements of real-time video to a level that can be supported by conventional mass storage devices as might be found in personal computers.

SUMMARY OF THE INVENTION

Accordingly, an image compression method is described which employs two steps, the first step allowing digital video to be compressed in real-time by a conventional microprocessor as might be found in a personal computer, the second step further compressing the image in non-real-time with significantly increased compression. The first step compression is executed very efficiently by a conventional microprocessor but achieves adequate compression to meet the bandwidth limitations of a conventional mass storage device, and does not significantly reduce the quality of the final compressed image compared to a one step compression algorithm.

Video data is digitized in real time by a conventional video digitizer. The data is subsampled horizontally and vertically resulting in a quarter resolution image (both horizontally and vertically). The video data is represented in a 4:2:2 YCrCb video format. This means that for every four pixels, four luminance (Y) values are provided, and two values are provided for each of the two chrominance components. Each of the components is represented by an eight bit value, resulting in a total of 64 bits (two 32-bit words) for the four pixels.

The subsampled video images are grouped into 2×2 pixel groups, each of which is also described by four luminance values and four chrominance values—two each of the two chrominance components. To further reduce the data, the chrominance components are averaged (added together and divided by two) and a pseudo-random number generator is used to add a noise component to the averaged values. After adding the noise, the chrominance components are quantized to five bits each.

A pseudo-random number is also added to each of the four luminance values. Two of the luminance values are then quantized to five bits, the other two to six bits. The total number of bits needed to represent the 2×2 pixel group is then 32 bits. These operations are performed on all the pixel groups in the image, resulting in an image compression of 2:1 compared to the subsampled 4:2:2 image. Although this is not significant compression, it is enough to allow the subsampled video data to be written to the hard drive in real-time. Further, the algorithm can be reversed with very good results, allowing it to be used effectively in the two step method.

This mechanism provides enough compression so that reasonable frame rates can be achieved when writing the video data to a conventional hard drive on a personal computer. However, the data capacity requirements are still too high for many multimedia applications. Fortunately, most of these applications deal with video clips that are relatively short. This method takes advantage of the fact that many personal computers have a significant amount of unused disk space which can be temporarily allocated to video compression. Although the system must be capable of recording video in real-time to disk, a second pass compression can be performed at less than realtime rates which can achieve significantly higher compression ratios.

Once the system has finished recording a video clip to disk (performing the associated compression), a background task is started which reads the compressed image file and performs a more sophisticated compression algorithm. This is generally done by performing a partial decompression of the compressed image and applying one of many more sophisticated compression algorithms (such as the well known JPEG or MPEG algorithms).

To facilitate improved partial decompression, the seed value used for the pseudo-random number generator used in the original compression algorithm is stored along with the compressed image data. The pseudo-random numbers which were added to each component can then be recreated and subtracted back from the luminance and chrominance components to reduce banding caused by simple quantization.

Once the image file has been compressed by the second pass algorithm, a new file can be created, or the old file can be transparently replaced with the new compressed image file, substantially reducing the required disk space. In this way, the personal computer user will have most of the benefits of a sophisticated VLSI compression processor (with its associated high compression ratios) on a much lower cost platform.

FIGURES

FIG. 1 shows a block diagram of the video digitization and compression process.

FIG. 2 provides a pictorial representation of the video image, showing example pixels which are referenced in the description of the invention.

FIG. 3 provides a pictorial representation of four pixels represented in the 4:2:2 video format.

FIGS. 4a and 4b provide a flow-chart of the first step image compression algorithm. FIG. 4a describes the initialization and loop control operations. FIG. 4b describes the actual pixel compression operations.

FIG. 5 provides a pictorial representation of the mapping of pixels in the image to compressed image samples.

FIG. 6 provides a pictorial representation of the data format of the compressed image samples.

FIGS. 7a and 7b provide a flow-chart of the first step image decompression algorithm. FIG. 7a describes the initialization and loop control operations. FIG. 7b describes the actual pixel decompression operations.

DETAILED DESCRIPTION

Figure 1:
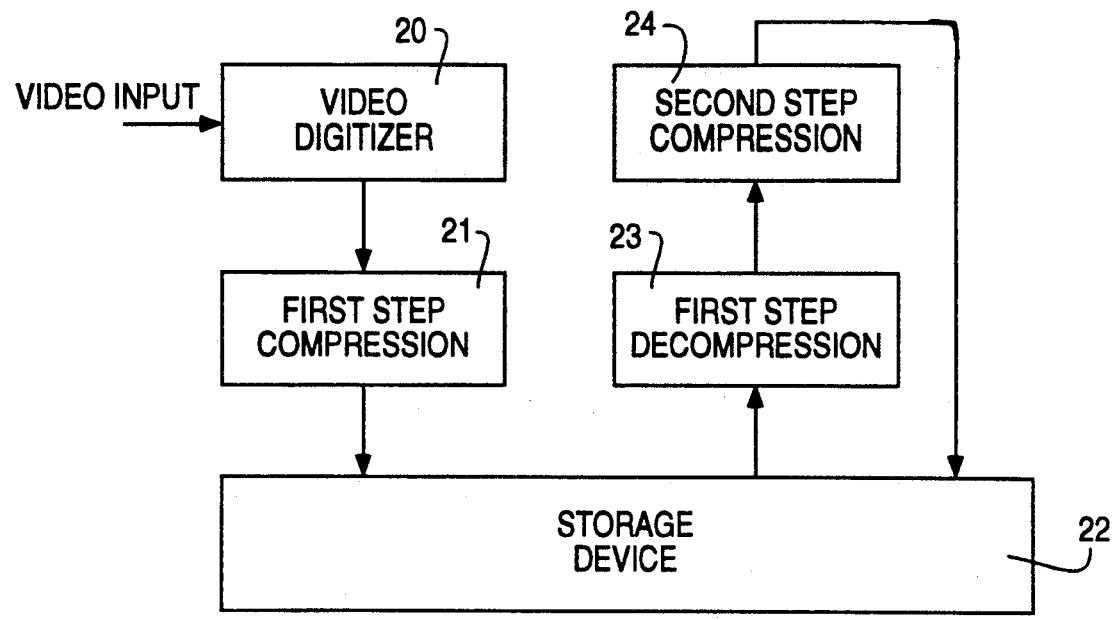

Referring to FIG. 1, the video image is digitized by a video digitizer 20 such as the SuperMac Video Spigot (SuperMac and Video Spigot are trademarks of SuperMac Technology, Inc.). In the preferred embodiment, the video digitizer uses digital filtering to reduce the high frequency components and generates 160 pixels along each scanline for NTSC (192 pixels for PAL/SECAM). At most one field from each frame are processed. Additional fields may be discarded depending on the processing power of the host processor. This allows time for the host processor to compress the image and write it to the hard drive As host processor performance improves, the invention can be applied to higher resolution and refresh rate video images.

The digitized data is transferred to a processor which performs a first compression step 21. In the preferred embodiment, this compression step is performed by the host processor in a Macintosh computer system (Macintosh is a trademark of Apple Computer, Inc.). This compression step could also be implemented on a different computer, or a specialized processor. After compression, the compressed data is stored on a storage device 22. In the preferred embodiment, this storage device is the hard drive on the Macintosh computer At some later time, the compressed data is read from the storage device and decompressed with an algorithm 23 which reverses the steps performed in the first compression algorithm. A second compression algorithm 24 is then applied to the image to generate a more highly compressed data set. These operations are not performed in real-time and therefore do not need to be as fast as the first compression step. This allows a much more sophisticated algorithm to be applied, resulting in higher compression ratios than could be achieved with a one-pass compression algorithm. In the preferred embodiment, both the first step decompression and the second step compression are performed by the host processor in the Macintosh.

If the second step compression algorithm is a partial superset of the first step algorithm, it may not be necessary to fully decompress the compressed image before applying the second pass algorithm to it.

The resulting data set from the second step compression 24 is written back to the storage device 22.

The second step compression may be performed at the users request or automatically, whenever the processor has spare time. The second compression step can result in new file, or it can be done in-place so that the no additional disk space is required. If the same file name is used, the user does not even have to keep track of which compression steps have been performed.

The specific algorithms used for the first and second step compression are not critical to invention, although the first step algorithm must have certain characteristics to make it work effectively in this two-step method. These are listed below.

1. The algorithm must be simple enough so that it can be performed in real-time by the processing resources available.
2. The algorithm must provide adequate compression to reduce the data bandwidth requirements to below what can be supported by the available storage device.
3. The algorithm must be able to be reversed with adequate image fidelity such that the image quality after the second step compression is perceptively of the same quality as it would have been if the second step compression were applied directly to the original image.

This two step compression concept can be applied using a variety of compression algorithms depending on the available computational resources and storage system bandwidth. For example, if a specialized image processor were available, the well known JPEG algorithm could be used for the first step compression, and the MPEG algorithm could be used for the second step compression. In this case, the MPEG algorithm typically requires four to five times more computational resources, but can typically achieve approximately three times better compression.

In the preferred embodiment, however, the first and second compression steps are performed by the standard host processor in a Macintosh computer system. Therefore, considerable less computational resources are available than would be needed to implement the JPEG algorithm in real-time, even for a low resolution image. Since it is not obvious how to implement a compression algorithm with the required characteristics as listed above, the algorithm used for the first step compression in the preferred embodiment is described below.

FIRST COMPRESSION STEP ALGORITHM

Figure 2:
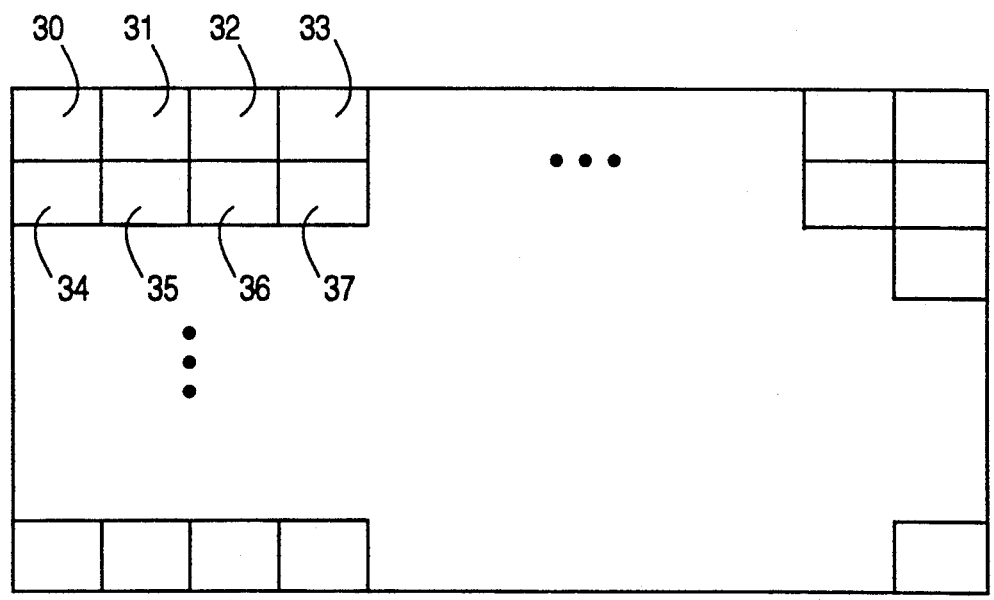
Figure 3:
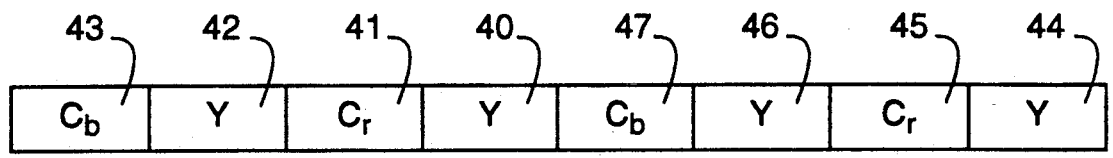

Referring to FIG. 1, the video data from the digitizer 20 to host processor memory in a 4:2:2 video format as shown in FIG. 3. For each four pixels (after subsampling) four 8-bit luminance values, one for each pixel, and two Cr chrominance values and two Cb chrominance values, one each for every two pixels, are provided. Referring to FIG. 2, a representative group of four pixels is shown in 30-33. These four pixels are represented by eight bytes as shown in FIG. 3. Referring to FIGS. 2 and 3, 40 is the 8-bit Y (luminance) value for pixel 30, 41 is the 8-bit $C_r$ (chrominance) value which is the average $C_r$ value for pixels 30 and 31, 42 is the 8-bit Y value for pixel 31, and 43 is the 8-bit $C_b$ (chrominance) value which is the average $C_b$ for pixels 30 and 31. Similarly, 44-47 are the luminance and average chrominance values for pixels 32-33.

The subsampled image is transferred to host processor memory as it is digitized. Once the first two scanlines have been transferred, the processor can start to compress the data. Two scanlines are necessary because the compression algorithm (described below) operates on 2×2 pixel tiles. The processor attempts to compress the entire image as it is transferred, although current processor technology is generally not capable of keeping up with the video in real time. However, since the video digitizer discards every other field, the processor may be able to catch up during the second field time. If not, additional fields can be discarded. The compressed data is written to the file system as compressed data blocks are completed.

FIRST COMPRESSION STEP ALGORITHM

The first compression algorithm operates on 2×2 pixel tiles from the transferred subsampled image. Therefore, the host processor cannot start compressing the image until the first two scanlines have been transferred to memory. Referring to FIG. 2, a first 32-bit word defining two pixels 30 and 31 from one scanline is read along with a second 32-bit word defining two pixels immediately below the first two 34 and 35 on the next scanline. The two 32-bit words therefore describe a 2×2 pixel tile. The compression algorithm operates on each 2×2 pixel tile independently. This process is similarly repeated for all the pixels in the subsampled image.

Figure 5:
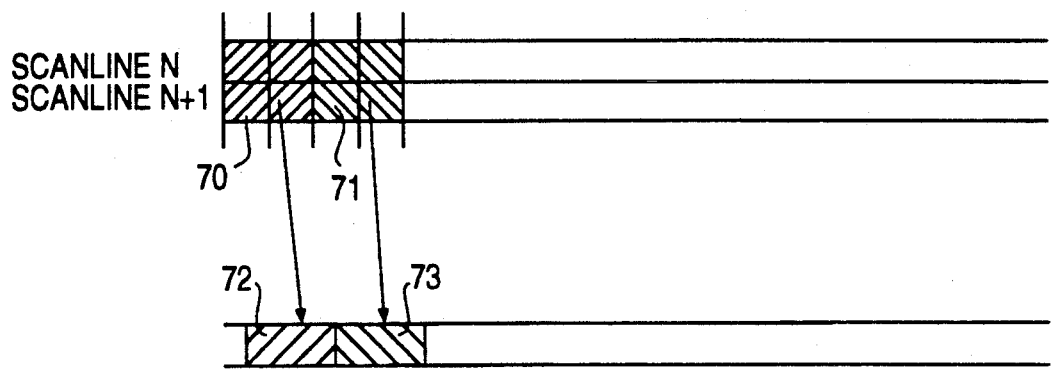

Referring to FIG. 5, the two words which define each 2×2 pixel group are compressed to one word. For example, the 2×2 pixel group 70 is compressed to 72. The next word in the compressed data stream 73 results from compressing 2×2 pixel group 71. The compression is accomplished by a combination of pixel averaging, dithering, and quantizing.

The flow chart of the first step compression algorithm is shown in FIG. 4. Referring to FIG. 4, the certain variables are initialized 48 such as masks that will be used for quantizing, and the seed value for the pseudo-random number generator that will be used for dithering.

An address pointer is used to read through the subsampled image to generate the compressed data set. This pointer is initialized with the address of the first pixel in the first scanline 49. Each 2×2 block of pixels that will be compressed is defined by the pixel that is pointed to by the address pointer, the next pixel in the scanline, and the two pixels below these two. The 2×2 pixel compression routine 50 is detailed by the flowchart in FIG. 4b.

Figure 4A:
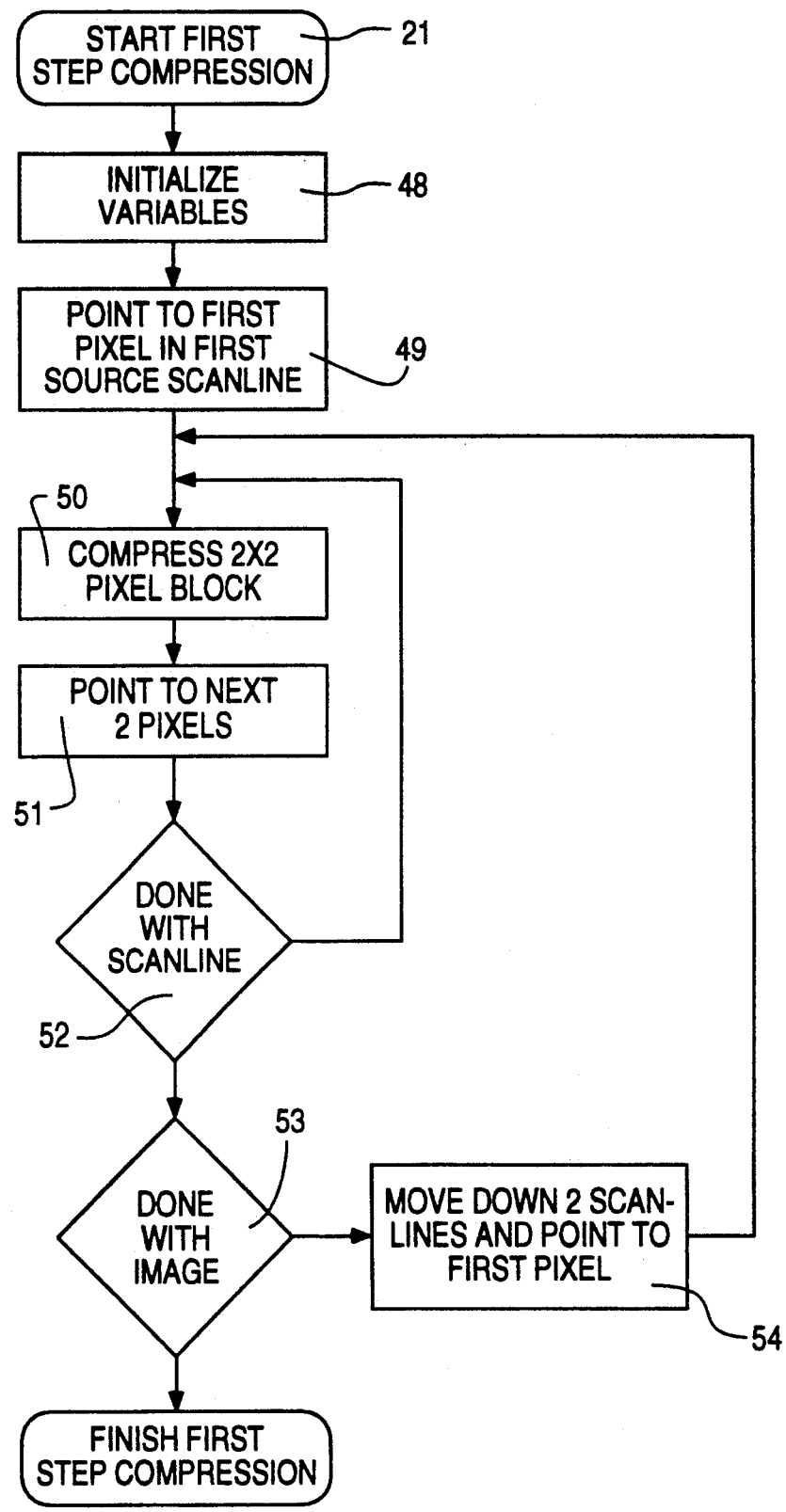
Figure 4B:
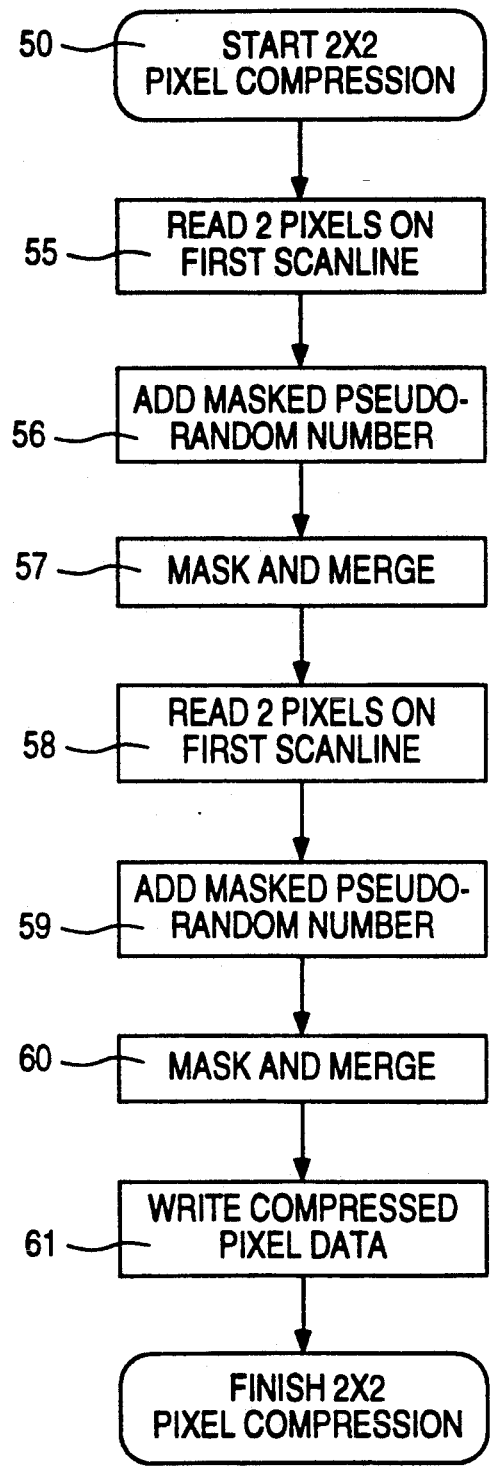

Referring to FIG. 4b, the pixels on the first scanline are read 55. These pixels are represented as a 32-bit word in the format defined in FIG. 3 as 40-43. This 32-bit quantity is added to a masked pseudo-random number 56.

The pseudo-random number is created using one or more of the well known linear feed shift registers. In the preferred embodiment, this is implemented in software by shifting a 32 bit long word right one bit. If the bit shifted from the LSB is '0', the value in the register is XORed with $A3000000 (a hexadecimal number). This results in a pseudo-random number which only repeats after $2^{32}-1$ iterations. Since this is many more iterations than there are pixels in the image, the noise signal appears totally random in the resulting image.

The pseudo-random number is masked $07070703 (hexadecimal numbers are indicated by a leading $ dollar sign) so that only small noise components are added to each of the luminance and chrominance components. After masking, the pseudo-random noise value can be added to the pixel values using a single 32-bit add. In the preferred embodiment, no overflow detection is required because the range of the luminance components from the video digitizer is limited to 16-235 (decimal) and the chrominance components are limited to 48-224 (decimal). Since the maximum value of the masked noise component in each byte is 7, the luminance and chrominance values cannot overflow into the next byte.

After adding the pseudo-random noise components, the 32-bit word representing the first two pixels is masked and shifted to reduce the number of bits required to represent the data. The mask value used in the preferred embodiment is $F8F8F8FC. This quantizes the first three components (the luminance component for the second pixel and the chrominance components for both) to five bits and the fourth (the luminance component for the first pixel) to six bits.

The luminance components are then shifted right to the end of the byte, leaving positions to specify the luminance components of the pixels on the second scanline. Once this is done, the two pixels from the second scan-line are read 58. A masked pseudo-random noise component is added 59 as before, although this time the pseudo-random noise value is masked with $07030707 before adding. The resulting value is then masked 59 with $00FC00F8, leaving only the luminance components, one quantized to six bits and one to five bits. These values are then shifted into position so that they can be merged with the quantized values from the first two pixels, resulting in a combined format as shown in FIG. 6.

Figure 6:
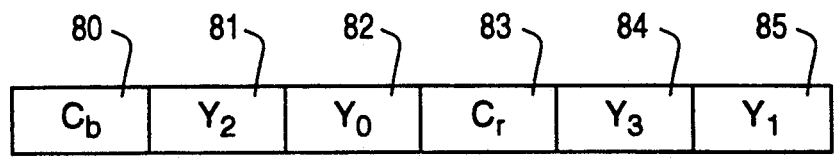

Referring to FIG. 6, the resulting compressed data format contains a quantized luminance component for each of the four pixels. The luminance components for two pixels, 84 and 82, are described using 6-bit values. The other two luminance components, 81 and 85, and the chrominance components, 80 and 83, are described using five bit values. This 32-bit quantity is written to the compressed image data structure 61.

In the preferred embodiment, the chrominance components of the two pixels in the second scan-line are not discarded. Instead, the chrominance components of the pixels in the two scan-lines are averaged for use in generating the final compressed data word.

Referring to FIG. 4a, after compressing the 2×2 pixel group, the address pointer is moved to the next 2×2 pixel group 51. This operation is similarly repeated for all the pixels along the scanline as determined by the conditional check 52. Conditional check 53 determines if all scanlines have been completed. If not, the address pointer is adjusted to point to the first pixel down two scanlines from the previous 54.

This compression algorithm results in a 2:1 compression of the subsampled image. The seed value for the pseudo-random number is saved along with the compressed pixel data. This seed value is used in the decompression process to improve the fidelity of the decompressed image.

This compression is adequate to allow a reasonable quality video sequence to be stored in realtime on a typical hard drive in the personal computer. Once the video clip has been compressed and stored on the hard drive, a background task is initiated which performs a more complex compression algorithm on the video frames. This second compression step can be done on command or automatically based on available CPU resources. The compressed video from the second compression step will be written into a second file which can be automatically substituted for the first file after the compression is complete.

SECOND COMPRESSION STEP

Each frame of the video sequence from the first compression step is first decompressed so that the more sophisticated compression algorithm can be performed. Of course, if the second step compression algorithm performs some of the same operations, these do not have to be backed out and then redone. To improve the integrity of the decompressed data from the first step compression algorithm, the seed value for the pseudo-random number generator is saved along with the compressed image. This allows the same pseudo-random number sequence to be generated during the decompression process.

Figure 7A:
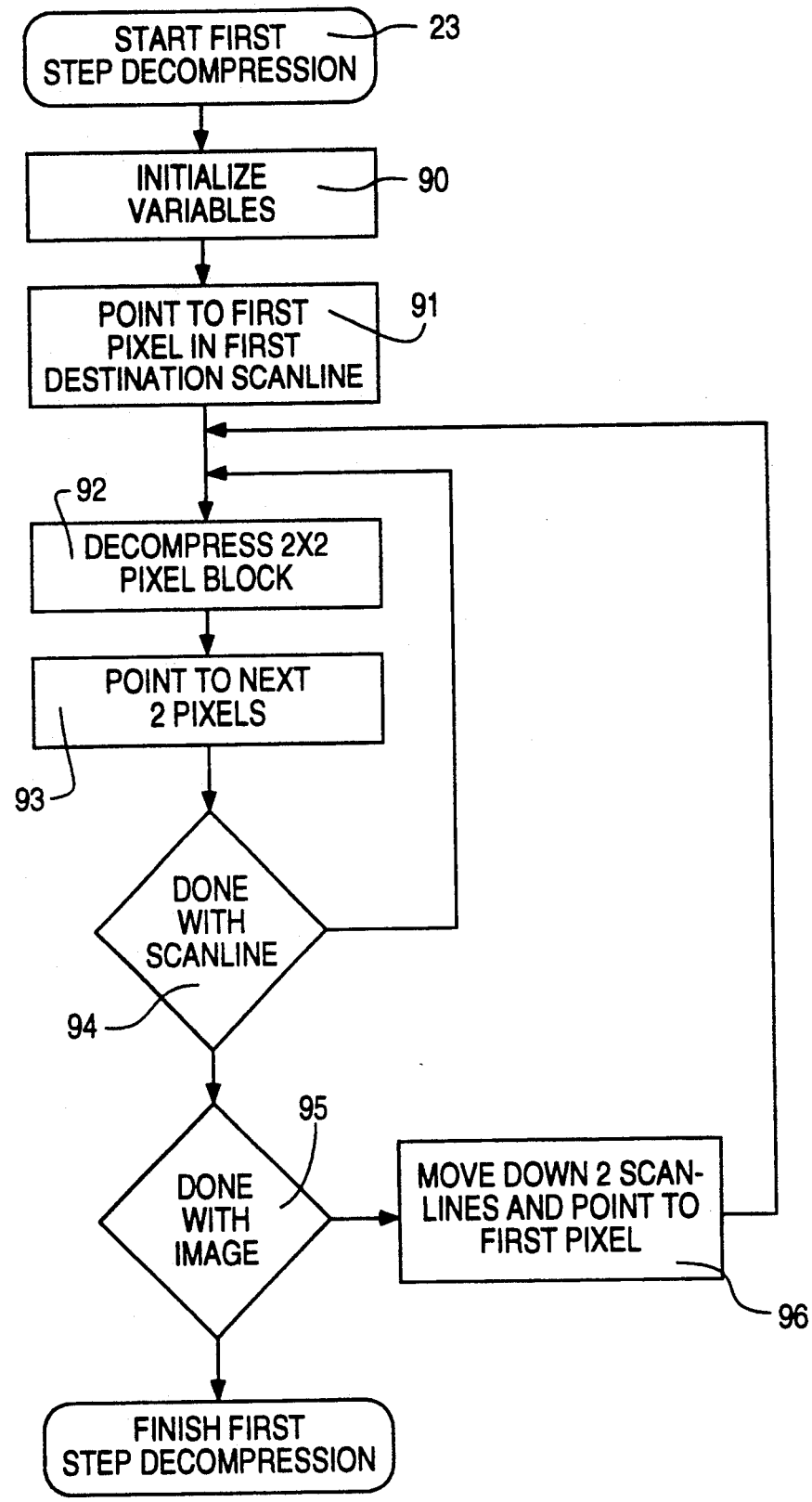

A flow chart of the algorithm used to decompress the image compressed using the first compression step algorithm is shown in FIG. 7. Referring to FIG. 7, this algorithm is very similar to the compression algorithm in overall structure. The mask values and pseudo-random number seed values are initialized 90 at the beginning of the program. The address pointer is initialized 91 to point to the first pixel in the first scanline of the destination image array.

Each 2×2 pixel block is decompressed 92 using the same method for loop control, 94 and 95, and address pointer adjustment, 93 and 96, as were used for the compression algorithm.

Figure 7B:
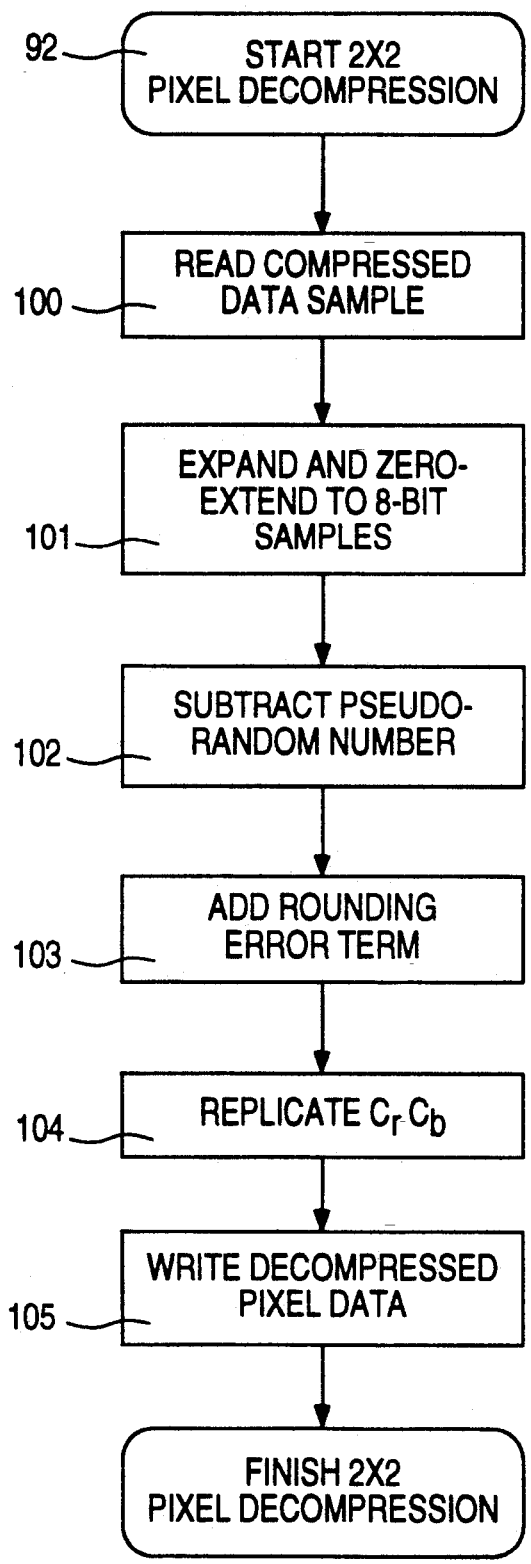

FIG. 7b provides the flow chart of the 2×2 pixel group decompression algorithm 92. Referring to FIG. 7b, the compressed data sample is read from the file 100 and expanded back into two 32-bit words 101 of the same format as the original pixel data. This is the 4:2:2 pixel format as described by FIG. 3. Each of the quantized color components is zero-extended so that it fills the complete byte.

Two pseudo-random numbers are generated using the same algorithm used for the compression step. By using the same algorithm and the same seed, the exact same numbers can be generated for each 2-pixel group during the decompression step. These pseudo-random number is then subtracted from the two 32-bit words 102 to reduce the effect of the noise component. Adding psuedo-random noise before quantization decorrelates the quantization noise from the source image. This technique reduces banding caused by simple quantization. Since the noise value is a positive integer, the color components will not be properly rounded after subtracting. Therefore, a value equal to half the maximum noise value is added to each of the color components 103. The discarded chrominance components are then replicated 104 for the second scan-line pixels, and the resulting pixels are written to the destination image buffer pointed to by the address pointer, 105.

Once the image is decompressed, a wide range of well known compression algorithms can be applied since the second step compression is not performed in real-time.

GENERAL

Although the preferred embodiment of this invention has been described as software algorithms operating on a personal computer, the invention is equally applicable to implementation in hardware or as a combination of hardware and software on generally purpose or specialized computer systems.

While the foregoing invention has been described with reference to its preferred embodiments, various modifications and alterations will occur to those skilled in the art. All such modifications and alterations are intended to fall within the scope of the appended claims.

What is claimed is:

1. A method of compressing color image data signals, comprising the steps of:
   a) receiving, under foreground control of a processor and in real time, a sequence of the color image data signals representing a color image;
   b) digitizing the data signals, thereby forming digitized data signals;
   c) compressing the digitized data signals in real time to a first compression ratio using a first data compression algorithm under foreground control of the processor, thereby forming first compressed image data;
   d) storing the first compressed image data in real time in a first quantity of digital memory under foreground control of the processor;
   e) upon completion of step d), retrieving from storage the first compressed image data and decompressing the first compressed image data under background control of the processor, thereby forming a decompressed digital signal;
   f) compressing the decompressed digital signal to a second compression ratio under background control of the processor, thereby forming second compressed image data; and
   g) storing the second compressed image data in a second quantity of the digital memory wherein the second quantity of the digital memory is less than the first quantity.

2. The method according to claim 1 wherein the digitized data signals represent a plurality of scanlines and each of the scanlines has a plurality of pixels arranged in an array, and further wherein the step of compressing the digitized data signals in real time includes the step of compressing 2×2 subarrays of the pixels independently.

3. The method according to claim 2 wherein each of said subarrays is compressed by adding first pseudo-random number data to two of the pixels in said each of the subarrays corresponding to a first scanline and adding second pseudo-random number data to two of the pixels in said each of the subarrays corresponding to a second scanline.

4. The method according to claim 3 wherein the pseudo-random numbers are formed using one or more linear feed shift registers.

5. A method of compressing a digital video data signal using a personal computer for display on a screen having scanlines of pixels, comprising the steps of:

a) reading two adjacent first pixels of a first scanline of the digital video data signal into the personal computer in real time;
b) adding first pseudo-random number data to the first pixels of the digital video data signal, thereby generating modified pixels;
c) masking and merging the modified pixels, thereby forming first compressed data;
d) reading two adjacent second pixels of a second scanline of the digital video data signal in real time into the personal computer, wherein the second pixels are adjacent the first pixels;
e) adding a second pseudo-random number to the second pixels of the digital video data signal, thereby generating modified second pixels;
f) masking and merging the modified second pixels, thereby forming second compressed data;
g) storing the first compressed data and the second compressed data in real time;
h) retrieving from storage and decompressing the first compressed data and the second compressed data, thereby forming a decompressed signal; and
i) compressing the decompressed signal under background control of the personal computer to generate a recompressed digital video data signal.

6. An apparatus for compressing color image data signals, comprising:
a) means for receiving, under foreground control of a processor and in real time, a sequency of the color image data signals representing a color image;
b) means for digitizing the sequence of the color image data signals, thereby forming digitized data signals;
c) means for compressing the digitized data signals in real time to a first compression ratio using a first data compression algorithm under foreground control of the processor, thereby forming first compressed image data;
d) means for storing the first compressed image data in real time in a first quantity of digital memory under foreground control of the processor;
e) means for retrieving from storage the first compressed image data and decompressing the first compressed image data under background control of the processor, thereby forming a decompressed digital signal;
f) means for compressing the decompressed digital signal to a second compression ratio under background control of the processor, thereby forming second compressed image data; and
g) means for storing the second compressed image data in a second quantity of the digital memory wherein the second quantity of the digital memory is less than the first quantity.

7. The apparatus according to claim 6 wherein the digitized data signals represent a plurality of scanlines and each of the scanlines has a plurality of pixels arranged in an array, and further wherein the means for compressing the digitized data signals in real time comprises means for compressing 2×2 subarrays of said pixels independently.

8. The apparatus according to claim 7, wherein the means for compressing the digitized data signals in real time further comprises means for compressing each of said subarrays by adding a first pseudo-random number to pixel data for two pixels in a first scanline and adding a second pseudo-random number to pixel data for two pixels in a second scanline.

9. An apparatus for compressing a digital video data signal for display on a screen having scan lines of pixels, comprising:
a) means for reading two adjacent first pixels of a first scanline of the digital video data signal under foreground control of a personal computer and in real time;
b) means for adding a first pseudo-random number to the first pixels, thereby generating modified pixels;
c) means for masking and merging the modified pixels under foreground control of the personal computer, thereby forming first compressed digital video data;
d) means for reading two adjacent second pixels of a second scanline of the digital video data signal under foreground control of the personal computer and in real time, wherein the second pixels are adjacent the first pixels;
e) means for adding a second pseudo-random number to the second pixels, thereby generating modified second pixels;
f) means for masking and merging the modified second pixels under foreground control of the personal computer, thereby forming second compressed digital video data;
g) means for storing the first compressed digital video data and the second compressed digital video data in real time;
h) means for retrieving from storage and decompressing the first compressed digital video data and the second compressed digital video data, thereby forming a decompressed signal; and
i) means for compressing the decompressed signal under background control of the personal computer to generate a recompressed digital video data signal.

* * * * *